[19] United States Patent
Kao

[11] 4,441,029
[45] Apr. 3, 1984

[54] HYDROPOWER TURBINE SYSTEM

[75] Inventor: David T. Kao, Lexington, Ky.

[73] Assignee: The University of Kentucky Research Foundation, Lexington, Ky.

[21] Appl. No.: 392,349

[22] Filed: Jun. 25, 1982

[51] Int. Cl.$^3$ .............................................. H02P 13/20
[52] U.S. Cl. ........................................ 290/52; 415/43; 415/157
[58] Field of Search ................... 290/52; 415/43, 117, 415/129, 141, 500, DIG. 1, 1, 148, 209, 157; 307/86

[56] References Cited
U.S. PATENT DOCUMENTS

| | | | |
|---|---|---|---|
| 1,494,842 | 5/1924 | Huguenin | 290/52 |
| 1,673,605 | 6/1928 | Tappan et al. | 415/43 |
| 4,367,890 | 1/1983 | Spirk | 290/52 |

Primary Examiner—J. V. Truhe
Assistant Examiner—Terry Flower
Attorney, Agent, or Firm—Birch, Stewart, Kolasch & Birch

[57] ABSTRACT

There is disclosed a new cavitation free hydraulic turbine system which fully utilizes well-established hydrodynamic theories useful for low-head hydroelectric applications. The hydropower turbine system of the present invention makes use of a fixed blade propeller turbine with reverse blade angle and an upward flow passage. To eliminate the complex flow control adjustable vane system and elaborate tube design and construction of the prior art, the new turbine system is provided with a vertical needle valve and a near zero absolute velocity free exit flow design.

9 Claims, 5 Drawing Figures

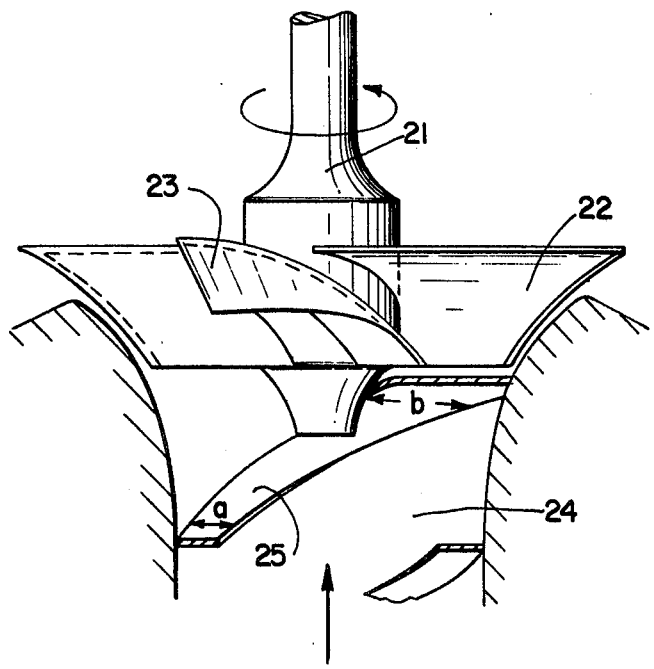
FIG. 3
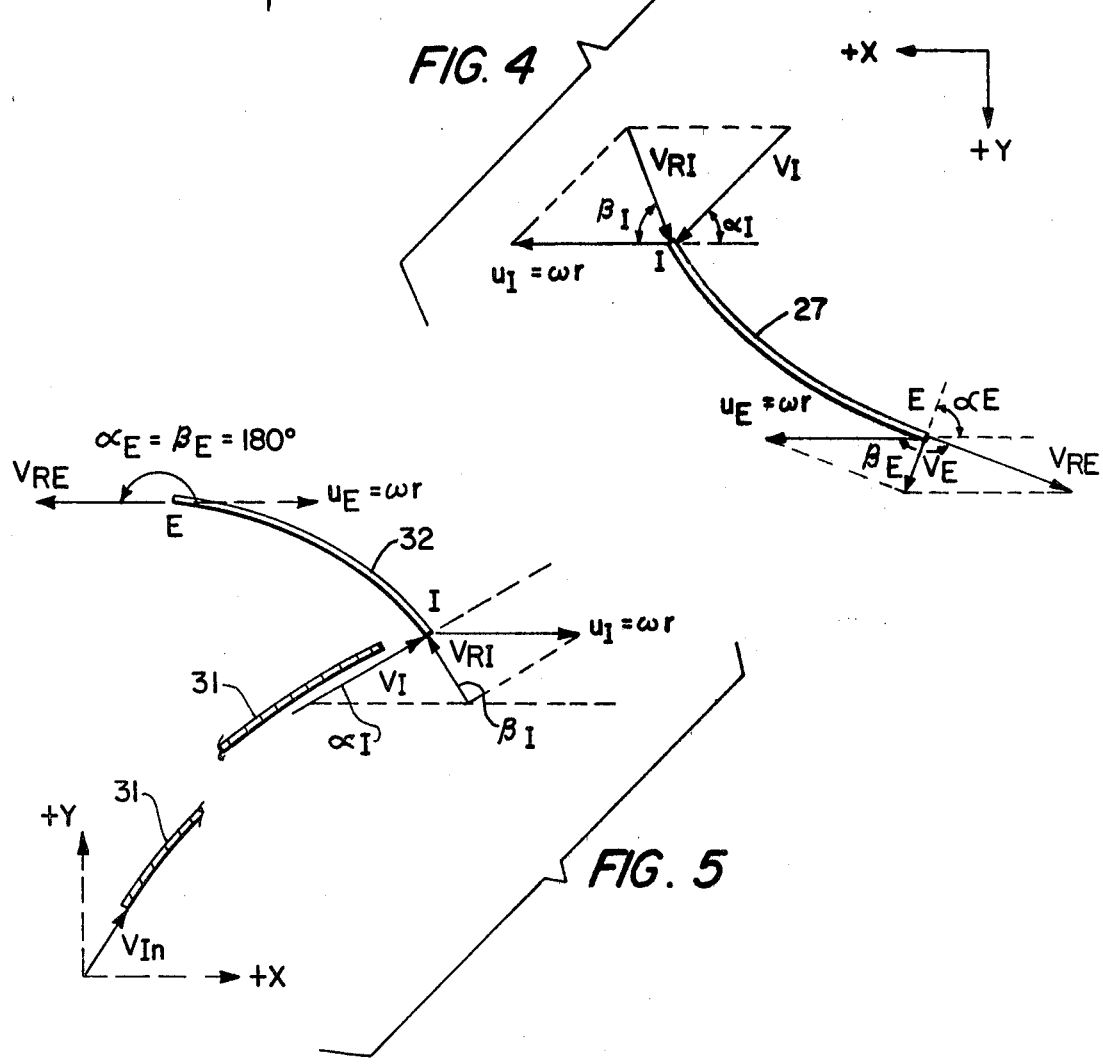
FIG. 4
FIG. 5

4,441,029

HYDROPOWER TURBINE SYSTEM

BACKGROUND OF THE INVENTION

The present invention relates to a hydroelectric turbine system and, more specifically, to a new low head or ultra low-head hydropower turbine system.

Water turbines that are best suited for hydroelectric power generation with proven efficiencies and established technological advancement are generally categorized into three groups, (1) Pelton wheels, which are impulse turbines of low specific speed and used for very high head applications, (2) the Francis turbine, which is categorized as a reaction turbine of medium specific speed for medium to high head applications, and (3) the propeller or Kaplan turbines, reaction turbines of high specific speed for low head application. Of these categories, only the propeller or Kaplan turbines would be considered for ultra low-head hydroelectric applications.

A fixed blade propeller turbine has an efficiency curve which decreases sharply for both increasing and decreasing flow and load conditions. This is due to the generation of hydraulic shock resulting from the change of the angle of the relative velocity as flow of the fluid enters the runner and/or the runner speed deviates from that of designed conditions. This makes the application of a fixed-blade propeller turbine unfavorable for fluctuating head conditions unless, of course, modifications are made. To eliminate this disadvantageous feature, changes have been made in the design by allowing the blade pitch to vary in response to the varying flow conditions. These design changes greatly improved the applicability of a propeller turbine under fluctuating flow conditions and load requirements and allowed the propeller turbine to operate at near peak efficiency under a wide range of water head conditions.

However, although the modifications discussed above have been found suitable to some degree in meeting the requirements of changing flow conditions in the related hydroelectric power generation systems, they are not without their disadvantages. For example, the mechanism used to adjust the pitch of the turbine blade is complex and very costly and, thus, for less demanding low head and ultra low-head hydroelectric applications, where a large runner diameter is likely needed, the use of the above-defined modified turbines is not considered economically feasible. In case of micro-hydropower generation, the high cost of the blade pitch adjustment mechanism produces a capital investment problem. In order to extract energy from the vastly available ultra low-head hydroelectric resources, new hydroelectric power generation systems are needed to improve the turbine design and system application so as to economically utilize these resources.

SUMMARY OF THE INVENTION

Therefore, it is an object of the present invention to provide a new ultra low-head hydropower generation system which will overcome the above and other disadvantages.

It is a further object of the present invention to provide a new hydroelectric power generation system which makes use of well-established hydrodynamic theories which will provide for quick implementation, requiring no new manufacturing techniques and/or tooling changes.

A further object of the present invention is to provide a new hydroelectric power generation system particularly suitable for use in a low-head application where flow velocity in the approaching intake channels is relatively small.

Still another object of the present invention is to provide a hydraulic turbine system having a new flow arrangement which greatly simplifies the hydropower generation system design and allows for the incorporation of high efficiency control devices into the system.

Yet, a further object of the present invention is to provide a hydraulic turbine system having substantially improved efficiency under ultra low-head conditions.

Another object of the present invention is to provide an economical hydroelectric turbine system which eliminates cavitation pressure thus greatly reducing fish mortality.

Still yet another object of the present invention is to provide an economical hydroelectric power generation system which minimizes environmental impact.

The foregoing objects and others are accomplished in accordance with the present invention, generally speaking, by providing a reaction hydraulic turbine system which operates under closed conduit flow conditions so as to deliver equal amounts of energy, as prescribed by the available water head, by allowing the water to flow upward through the turbine runner. The high energy content water flow is introduced into the turbine system from below the runner and moves upward to exit substantially horizontally from the top of the turbine runner either into the tail water pool or into the free atmosphere. This allows the connection shaft to the generator to be installed on the low energy side or above the tail water without becoming submerged. The fixed blade propeller turbine runner is vertically positioned such that the hydraulic thrust, which approximately equals the static pressure times the runner projectional area for propeller turbines, acts in the opposite direction to the gravitational field in the system. This helps to sustain or balance the weight of the runner and its accessories so as to greatly reduce pressure on the bearings. Positioning the generator at the low energy level side or above the tail water, completely eliminates the need for high pressure water sealing around the rotating shaft. The need for a shaft gland, therefore, is completely eliminated. This simplifies the system design and construction so as to eliminate the requirement for periodical maintenance of sealer rings. The runner housing is fabricated so as to have an inner scroll wall which functions to reduce the cross-sectional area between the area of the flow intake and a vertical section or column of the housing which surrounds the fixed blade propeller turbine runner. A low energy loss, substantially neutrally buoyant needle valve is located below the flow discharge channel of the housing, which regulates the flow discharge by contraction of the discharge area, thus functioning as a flow control device. This eliminates the necessity to create an internal eddy turbulence which dissipates the available head, as is often the case with the conventional wicket gate control vanes. The needle valve is known for its low energy loss co-efficient and high efficiency, i.e., 98 percent or higher. The needle drum, which serves as the inner core of the scroll wall of the runner housing, may be adjusted up or down into closed or open positions by regulation of the control fluid inside it, thus minimizing the effort required of a mechanical or hydraulic device provided to move the needle drum accordingly. The needle valve is utilized as a means to produce in the vertical column a free vortex flow which is essential for the propeller motor and relies mainly on reduction of flow passage area without spending an excessive amount of energy as the means for flow rate reduction. Several spiral vanes may be provided inside the vertical inflow column within the reduced cross-sectional area of the housing. The width of the vane will vary from a fraction of the runner blade dimension to near the full width of the blade in the direction of the flow. The angle of the downstream or upper end of the vane may be adjusted to provide a gradual guide to the vortex flow such that a relative velocity is always produced which enters the fixed blade propeller turbine runner tangentially to the runner blade, thereby avoiding the generation of shock upon the blade.

It has been determined in the course of the present invention that a cavitation free low-head hydropower turbine system can be designed which has distinctive hydrodynamic and economical advantages over conventional turbine applications, making use of fixed blade propeller turbines with reversed blade angles and upward flow passage. To eliminate the conventional complex, flow control adjustable vane gate systems and elaborate draft tube designs and construction, the turbine system of the present invention is equipped with a vertical needle valve and a near zero absolute velocity free exit flow design, respectively. The near zero absolute velocity is made possible because of the free exit flow design which cannot be utilized in the conventional downward turbine flow arrangement because of the potential problem of maintaining the system always full flowing. In the present invention, the unique upward flow design eliminates such concern, while proper design of the exit angle of the runner blade leads to near complete utilization of the total kinetic energy contained in the flow, with the water mass leaving the runner system radially riding primarily on its relative velocity and small centrifugal acceleration. This is not possible, if the turbine flow must be restricted inside a draft tube as is the case in conventional hydraulic turbine system designs because the draft tube has a finite cross sectional area as opposed to the infinite exit flow area utilized in the present invention. The new turbine arrangement of the present invention eliminates the need for a draft tube for the postrunner residual kinetic energy recovery.

The system of the present invention differs from conventional vertical downflow setting and low-head inclined tubular arrangements by allowing the water to flow upward through the turbine runner. Because of the new flow arrangement, it is possible to simplify the hydropower generation system design and thereby incorporate high efficiency control devices into the system. Since there is no need to have an axial velocity component to deliver the discharge through a draft tube, the aft-edge of the propeller blade may be curved to permit the flow to exit in a near horizontal direction. By so doing, the exit water is designed to flow as a free stream with near zero absolute velocity such that no residual kinetic energy head will be wasted. The system aerates the water thus improving the oxygen content and releases saturated nitrogen.

DETAILED DESCRIPTION

The invention is further described in detail by way of the accompanying illustrations wherein:

FIG. 3 represents a simplified design configuration of the runner and flow guide system of the present invention;

FIG. 4 represents a schematic drawing of the flow velocity and blade motion relationship of a conventional downward flow reaction turbine design; and FIG. 5 represents a schematic drawing of the flow velocity and blade motion relationship of the present invention.

Figure 1:
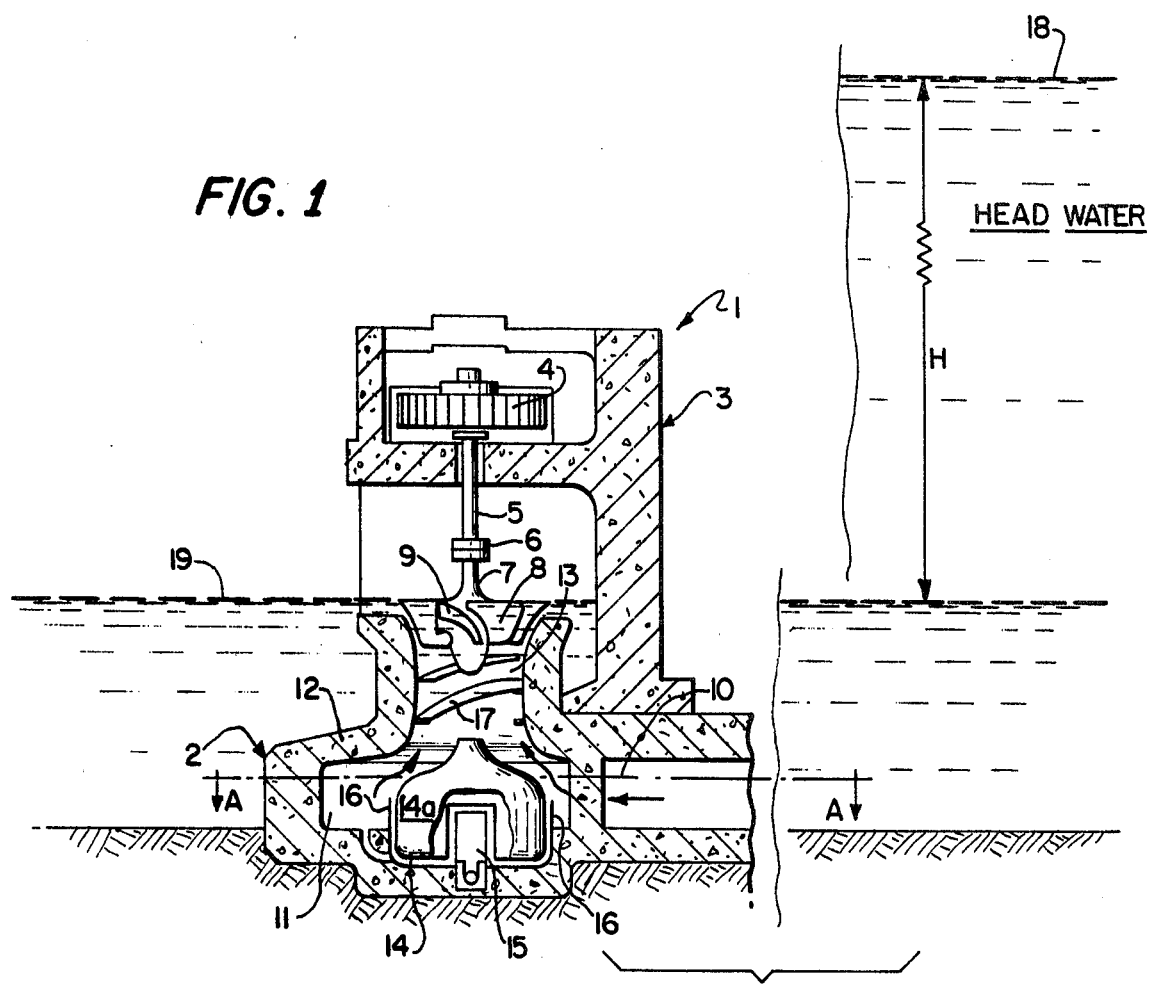
FIG. 1 represents a cross-sectional view of the configuration of the low-head hydropower turbine system of the present invention.

Referring now to FIG. 1, there is seen in cross-section the low-head hydropower generation system of the present invention, generally designated 1, which can be made and is herein represented in a modular form for ready retrofitting onto existing dams or for use in other micro-hydropower generation circumstances. The hydropower generation system 1 is divided into a flow conduit unit 2 and a runner-generator unit 3. Each unit can be constructed separately and assembled at the site of use. The runner-generator unit 3 comprises a generator 4 connected by stem 5 through flange 6 to the fixed blade propeller turbine runner 7 which comprises the fixed blade propeller 8 generally provided with tipfins 9, which reduce leakage and provide further reinforcement. The flow conduit unit 2 comprises a flow intake 10 which directs the fluid in the direction of the arrow into the cavity or chamber 11 of the runner housing 12, having an inner scroll wall. The inner scroll wall reduces the inner surface of the housing 12 which terminates as the vertical discharge column 13 surrounding the fixed blade propeller turbine runner 7.

A simple needle valve 14 controls the flow discharge mainly by the contraction of the discharge area of the vertical flow or discharge channel 13. The needle drum 14a, which serves as the inner core of the housing 12, is assisted in its up and down or closed and open functions by a hydraulic control device 15, herein represented as a hydraulic piston. A needle valve guide 16 is provided between the needle valve drum 14a and the inner walls of housing 12. Adjustable vortex flow spiral guide vanes 17 are optionally provided, installed inside the vertical flow column 13, which help maintain peak runner efficiency. The width of the vanes may vary from a fraction of the blade width to near the width of the blade in the direction of the flow. The angle of the downstream end of the vane can be adjusted as further discussed below (See FIG. 4) to control the relative flow velocity so as to avoid generation of shock upon the blade. Elimination of hydraulic shock will not only increase the runner efficiency but also reduce the blade vibration and increase blade life. The integrated use of the propeller runner blade tip-fins 9 changes the line contact between the blade and the tubular housing to one of an area contact. This further helps to decrease water leakage between the blade and the housing wall and to increase efficiency. The runner blades can be so designed that the outflow of water from the runner 7 leaves the blade at a near zero absolute velocity as the water is delivered into the tail water stream simply by overflow or the small remaining centrifugal acceleration. The water head is measured from the normal head water 18 to the normal tail water 19.

Figure 2:
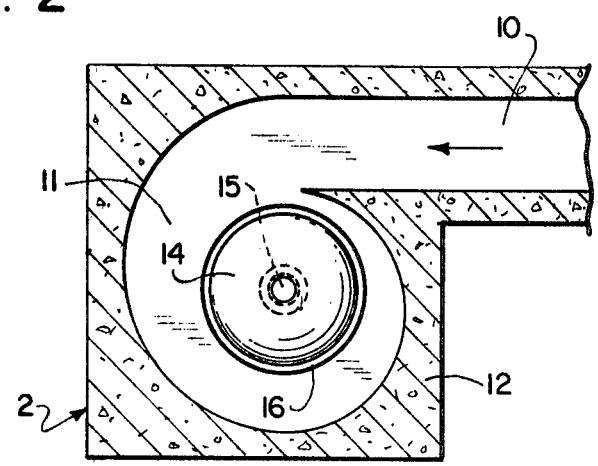
FIG. 2 represents a plan view of section A—A of FIG. 1 illustrating the spiral configuration of the turbine system of the present invention.

In FIG. 2 there is seen in section A-A the flow conduit unit 2 of FIG. 1 illustrating the flow intake 10 which directs the fluid in the direction of the arrow into the chamber 11 of the runner housing 12, the chamber 11 converging in a spiral configuration to define the inner scroll wall referred to above. A needle valve 14, hydraulic control device 15 and needle valve guide 16 completes the representative features of the sectional unit.

Referring now to FIG. 3, there is seen an enlarged sectional view of the fixed blade propeller turbine runner designated 21, comprising blade 22 with tip-fins 23. The vertical inflow column 24 is provided with spiral vanes 25 for control of the vortex flow as indicated by the arrow. The width of the vanes vary from a fraction a of the propeller blade upstream to near the width of the runner blade b downstream. The spiral vanes are adjustable and installed on a fixed boundary and, thus, much simpler and easier to construct and control. In a conventional hydropower system, localized cavitation pressure, which takes place at the downstream side of the runner inside a conventionally used draft tube, has always been a problem of great concern. In the system of the present invention, the draft is eliminated and atmospheric pressure serves as the lower limit of the low energy level since the outflow or overflow leaves the runner under a free-flow condition. This, in turn, completely eliminates the possibility of cavitation. Because of the elimination of the cavitation induced blade vibration and the additional reinforcement provided by the tip-fins, the runner may be constructed not only of elastic material such as steel, but also of a lighter material such as a plastic material, which enhances the mobility of the turbine.

FIG. 4 represents a schematic drawing of the relationship of the flow velocities to the blade motion of a conventional propeller turbine design. Flow conditions represented as the inflow (I) and exit flow (E), entering into and exiting from the runner blade 27 respectively are illustrated along a given radius, r of the blade at the point of measurement. The linear velocity of the blade is $u = \omega r$, wherein $\omega$ is the angular speed of rotation of the runner in radians, and the absolute velocities of water flow measured with respect to a stationary frame of reference equal $V_I$ and $V_E$ at entrance and exit, respectively. The relative water velocities measured with respect to the moving blade are designated as $V_{RI}$ and $V_{RE}$ which represent the vector differences of the linear blade motion velocity, u, and the absolute velocities of water mass at the corresponding points I and E. It should be noted that, since the water flow exits from the conventional runner blade inside a draft tube with a finite cross-sectional area approximately equal to the projectional area of the runner, an axial direction absolute velocity component at the exit, E, must exist in order to deliver the total amount of water through the turbine system to the tailwater pool. This remaining axial absolute velocity component $V_E$ is proportional to the unused kinetic energy and represents a waste of the available energy. To minimize such waste of energy an elaborate draft tube system must be designed and constructed to recover part of the remaining kinetic energy head by creating negative pressure at the downstream side of the runner (equivalent to increase in effective head). This often creates a problem when the actual water head condition changes which causes the local negative head to become lower than cavitation pressure. As a result runner blade vibration and corresponding erosion occur, and aquatic life (fish) will parish when passing through the sudden pressure change zone. These problems are more severe in low head hydropower applications where larger runner units are used.

In the present invention, the above described problems are eliminated because the exit water is released into the tailwater channel freely under atmospheric or submerged conditions. With the exit flow being released into a pool of infinite dimension (as compared with the draft tube cross sectional area) in a near horizontal radial direction the absolute velocity of the exit water can thus be reduced to near zero in magnitude. As illustrated in FIG. 5, the upward flow turbine gains an initial free vortex flow pattern as the water leaves the scroll and enters the vertical column $V_{In}$. The guide vanes 31 provide further control to the vortex flow so that the flow velocity vector, $V_I$, will yield, when combined with the linear velocity $u_I$, a relative velocity, $V_{RI}$, that is tangent to the blade 32 at the entrance. Since no axial absolute velocity is needed to deliver water out of the runner housing, the exit angle of the blade can be designed essentially to have a tangent line in a horizontal direction as shown by $V_{RE}$ in FIG. 5. The relative velocity at the exit can be designed to have a magnitude equal to or greater than the linear velocity, $u_E$, at the point of the exit. In case of the former, all tangential forces on the runner are provided by the flow of water at the entrance while in the latter case the runner will utilize also the thrust provided by the flow at the exit in the form of complete energy recovery without waste. A clear capital cost reduction in terms of savings are realized by the elimination of the costly blade adjustment mechanism and elaborated draft tube construction. In addition, the savings from elimination of the gland-seal unit construction and its related maintenance are also significant. Improvement of efficiency will be recognized due to the reduction of dynamic friction and flow turbulence through the complex wicket gate used in the conventional design, reduction of water leakage and complete energy recovery. As represented in FIGS. 3 and 4, $\alpha$ equals the angle of the absolute velocity of the fluid and the linear velocity of the blade motion at the point where the absolute velocity is indicated and $\beta$ equals the angle between the relative velocity of the fluid and the linear motion of the blade at the point where the relative velocity is indicated. In the case of the present invention due to the fact that $\alpha_E \cong \beta_E \cong 180°$, and $V_{RE} \geq u_E$, substantially complete utilization of the available kinetic energy in the flow is realized. The angle of the blades thus forms its own unique relationship which could not be adapted to the conventionally existing turbine systems. The introduction of the adjustable spiral vorex flow guide vanes further enables the system of the present invention to operate at a high efficiency at different heads.

The hydroelectric turbine system of the present invention can easily be made into modular form for micro-hydropower applications where only tens or hundreds of kilowatt potential are available to serve private or community needs. In many cases a small unit can be retrofitted onto reinforced normal outlet work for existing dams making use of the presently waste water resources. Thus, if the blade materials can be constructed of light weight materials, then the overall mobility of the system is enhanced.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A cavitation free, upward flow, low-head hydropower turbine system which comprises
   (a) a flow conduit unit inclusive of a runner housing which defines a chamber, a flow intake means which directs fluid into said chamber, said runner housing having an upper narrow portion defining a vertical discharge channel for said fluid, and a valve means positioned beneath said narrow portion of said runner housing within said chamber for controlling said fluid flow discharge from said vertical discharge channel; and
   (b) a runner-generator unit including a generator and a fixed blade propeller turbine runner which is at least partially surrounded by the vertical discharge channel of said flow conduit unit.

2. The system of claim 1, wherein said flow conduit unit and said runner-generator unit are provided in modular form.

3. The turbine system of claim 1, wherein said runner housing of said flow conduit unit has an inner scroll wall which functions to reduce the cross-sectional area between said flow intake means and said vertical discharge channel surrounding said fixed blade propeller turbine runner.

4. The system of claim 1, wherein adjustable vortex flow guide vanes are provided on the inner wall of said vertical discharge channel.

5. The system of claim 1, wherein said valve means comprises a needle valve drum and further includes a hydraulic control device to assist said valve in controlling said fluid flow discharge.

6. The hydropower turbine system of claim 1 wherein said fixed blade propeller turbine runner is vertically positioned within said vertical discharge column of said runner housing such that a hydraulic thrust is imposed upward opposite to the gravitational field of the system.

7. The hydropower turbine system of claim 6 wherein said fixed blade propeller turbine runner is provided with tip-fins.

8. The hydropower turbine system of claim 6 wherein said turbine runner comprises an elastic or plastic material.

9. The hydropower turbine system of claim 1 wherein the exit angle of said turbine runner blade is designed such that said fluid is discharged at near zero absolute velocity in a near horizontal radial direction at a point no higher than the top of the runner.

* * * * *